United States Patent
Scheerer et al.

(10) Patent No.: US 9,483,287 B2
(45) Date of Patent: Nov. 1, 2016

(54) COMMUNICATION INFRASTRUCTURE FOR VIRTUAL MACHINES

(71) Applicants: Johannes Scheerer, Heidelberg (DE); Matthias Braun, Illingen (DE); Ralf Schmelter, Wiesloch (DE); Dietrich Mostowoj, Ludwigshafen am Rhein (DE); Thomas Klink, Moerlenbach (DE); Michael Wintergerst, Muelhausen (DE); Steffen Schreiber, Frankenthal (DE)

(72) Inventors: Johannes Scheerer, Heidelberg (DE); Matthias Braun, Illingen (DE); Ralf Schmelter, Wiesloch (DE); Dietrich Mostowoj, Ludwigshafen am Rhein (DE); Thomas Klink, Moerlenbach (DE); Michael Wintergerst, Muelhausen (DE); Steffen Schreiber, Frankenthal (DE)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 14/489,369

(22) Filed: Sep. 17, 2014

(65) Prior Publication Data
US 2016/0077894 A1    Mar. 17, 2016

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/455* | (2006.01) |
| *G06F 9/54* | (2006.01) |

(52) U.S. Cl.
CPC ........... *G06F 9/455* (2013.01); *G06F 9/45558* (2013.01); *G06F 9/544* (2013.01); *G06F 8/70* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 5,305,461 | A * | 4/1994 | Feigenbaum | G06F 9/543 711/165 |
| 2004/0250244 | A1* | 12/2004 | Albrecht | 717/135 |
| 2006/0197763 | A1* | 9/2006 | Harrison | G06Q 10/10 345/441 |
| 2014/0195928 | A1* | 7/2014 | Carlen | G06F 3/0484 715/752 |

\* cited by examiner

*Primary Examiner* — Craig Dorais
(74) *Attorney, Agent, or Firm* — Schwegman Lundberg & Woessner, P.A.

(57) ABSTRACT

In an example embodiment, a communication is received from a software tool. The communication may be intended for a virtual machine and may contain an identification of a virtual file. A virtual file can then be retrieved using the identification. The virtual file defines a file socket, the file socket providing a communications channel for stream-based communications. Then the file socket can be established as a communications channel between the software tool and the virtual machine based on the virtual file.

18 Claims, 8 Drawing Sheets

COMMUNICATION INFRASTRUCTURE FOR VIRTUAL MACHINES

TECHNICAL FIELD

This document generally relates to virtual machines. More specifically, this document relates to a communication infrastructure for virtual machines.

BACKGROUND

In order to debug or profile a virtual machine (VM), a communication channel is established from the external tool (e.g., the debugger or profiler) to the VM. Depending on the implemented protocol, sensitive data has to be transferred between the two processes. Typically the tool winds up gaining significant control over the target VM. This presents a security issue.

One possible solution would be to open a network connection (Transmission Control Protocol (TCP) socket) in conjunction with an additional security policy including a complex authentication process (e.g., Secure Sockets Layer (SSL)). This necessitates a very high protocol overhead and a lot of configuration.

For this reason, standard debugging protocols, such as Java Platform Debugger Architecture (JPDA), lack security restrictions. The VM simply opens a network port for the debugging client and it is up to the system administrator to somehow make sure that the open port on the machine is not misused by a hostile process, such as by configuring a firewall.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, a communications infrastructure is provided that allows a local software tool, such as a debugger, to communicate with a target virtual machine (VM) in a fully secure way without having to implement and configure a complex security later in the VM. Additionally, in an example embodiment, debugging can be accomplished via a service instance, either secure or unsecure.

In an example embodiment, file sockets are utilized in order to establish a link between the software tool and the VM. From a functional point of view a file socket provides two connection endpoints for a stream-based communication which have to be established on the same host. More specifically, a file socket is a socket that has an endpoint that does not need a port that is reachable by remote processes. Instead of Internet Protocol (IP) addresses and ports (as used by traditional sockets for addressing), file sockets may have a unique character sequence to identify them uniquely. The communication channel for the data transfer via the file socket may be constructed as a virtual file in the operating system's file system. Therefore, the access rights for the file socket endpoints may be defined by the virtual file in the file system, which means that the creator process of the file socket has full control over the access rights on the level of the operating system's file access rights. Hence the complex task of implementing a security policy is solved by the security concept of the operating system's file system. There is also no open port to provide security vulnerability.

The naming convention used for the virtual file associated with a particular file socket may vary based on the platform in which it is implemented. For example, in a Windows platform, the name may follow the rule \\.\pipe\pipeline" and identify a Windows kernel object. The "pipeline" aspect is what may be modified to uniquely identify the associated file socket. In an example embodiment, the "pipeline" in the rule may be replaced by an identification of the windows kernel object, an identification of a user under which the associated file socket is running, and an identification of a process utilizing the file socket. Hence, the name "\\.\pipe\jvm_profiling_server_1000_2345" may uniquely identify a virtual file associated with a file socket having a kernel object of "jvm_profiling_server" for user 1000 and process 2345.

In another platform, the naming convention may be different. For example, in Unix, the name associated with "pipeline" in the above rule may be the same, but the prefix may differ. So, for example "/tmp/jvm_profiling_server_1000_2345" may uniquely identify a virtual file associated with a file socket having a kernel object of "jvm_profiling_server" for user 1000 and process 2345.

In an example embodiment, file sockets are used to ensure that only a limited group of users, such as the users who have at least the same file access rights as the operating system user who owns the VM process, can attach a debugger or other software tool to the target VM. This makes it possible to debug productive systems at the user's site without taking the risk of a security vulnerability.

As described so far, the debugging service based on file sockets may only be reachable from the same host where the target VM is running. In order to make the file socket endpoints accessible remotely, the concept of file socket services may be introduced. A file socket service provides two communication endpoints:

(1) A standard socket endpoint specified by a port for remote network communication.

(2) A file socket endpoint for local communication.

A file socket service forwards all data it receives on one endpoint to the other endpoint and vice-versa. From the remote debugger tool's perspective (or from the perspective of another software tool), the service is fully transparent, i.e., it works as a proxy for the VM. The same holds true the other way around. Thus, neither the software tool nor the VM is aware of the presence of the file socket service.

In order to enforce a security policy, the service can implement a proper security strategy. For example, Secure Sockets Layer (SSL), firewalls, or a dedicated tunnel via a router may be established. In an example embodiments, it is in the hands of the VM owner to choose and configure a proper strategy, to his or her liking.

This approach allows users to decide the level of security by configuring the service (at VM runtime), the VM is free of security vulnerabilities and does not need to be adapted for the remote case, and, in contrast to existing approaches, users may decide to limit debugging or other functionality to local access by simply not starting or utilizing the file socket service.

Figure 1:
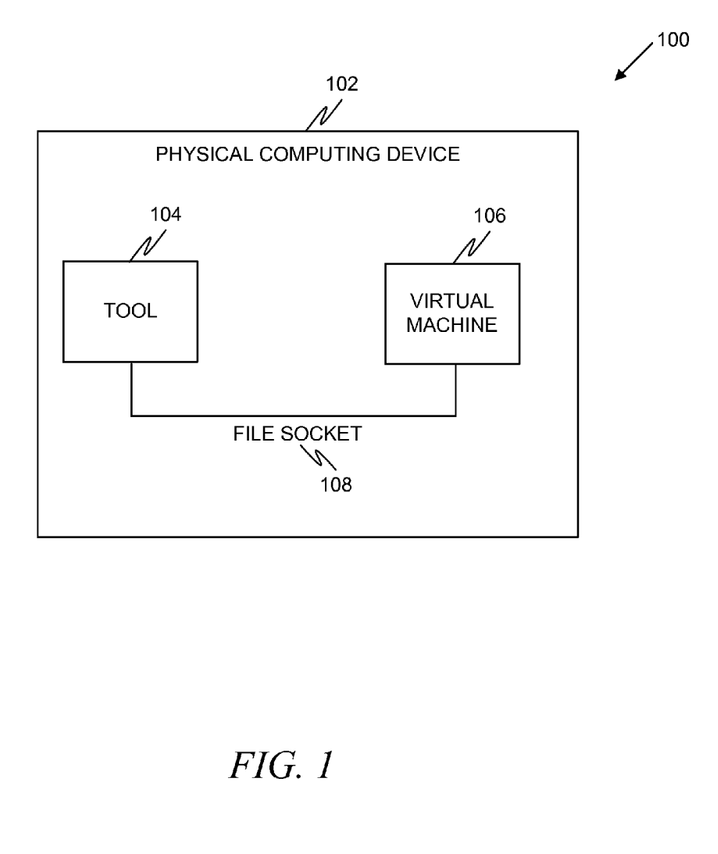
FIG. 1 is a block diagram illustrating a system in accordance with an example embodiment.

FIG. 1 is a block diagram illustrating a system 100 in accordance with an example embodiment. The system 100 includes a physical computing device 102, such as a desktop computer, laptop computer, or server. The physical computing device 102 includes a tool 104 and a virtual machine 106. The tool 104 may be, for example, a debugger or a profiler. A file socket 108 may provide the communication interface between the tool 104 and the virtual machine 106.

Figure 2:
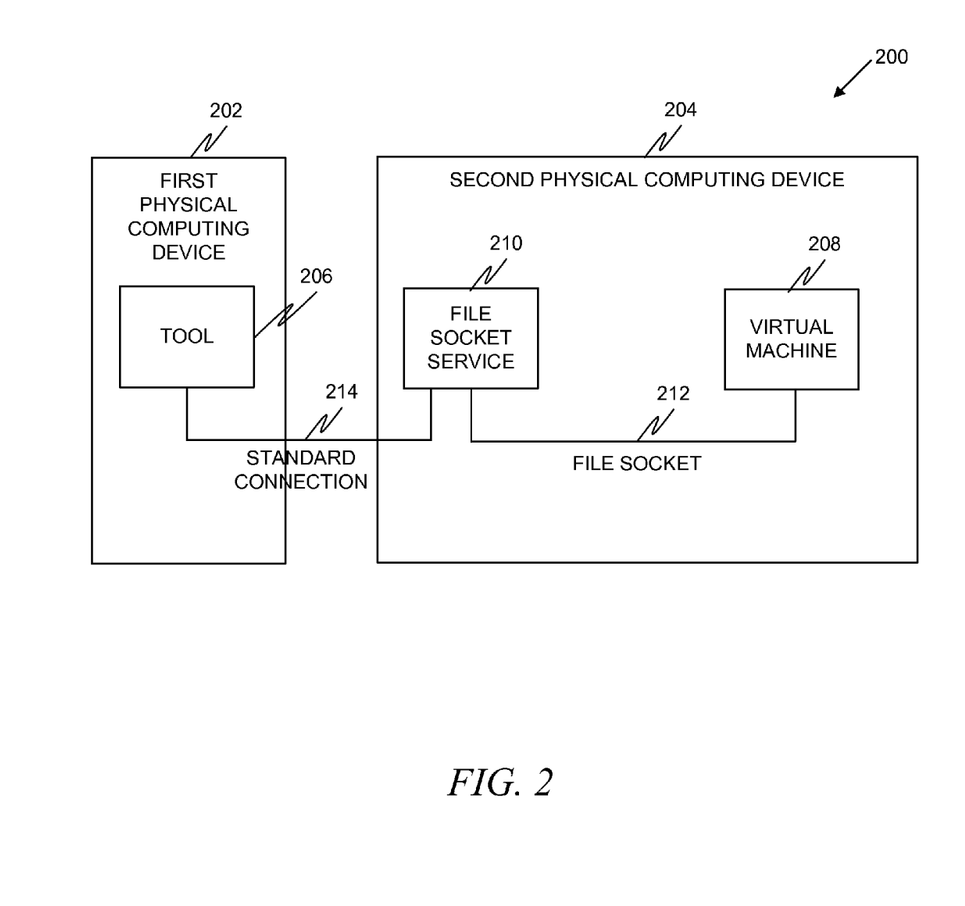
FIG. 2 is a block diagram illustrating a system in accordance with an example embodiment.

FIG. 2 is a block diagram illustrating a system 200 in accordance with an example embodiment. The system 200 includes a first physical computing device 202 and a second physical computing device 204. The first physical computing device 202 may contain a tool 206. The tool 206 may be, for example, a debugger or a profiler. The second physical computing device 204 may contain a virtual machine 208. A file socket service 210 may be located on the second physical computing device 204. A file socket 212 may provide the communication interface between the file socket service 210 and the virtual machine 208. The file socket service 210 may communicate with the tool 206 on the first physical computing device 202 via a standard communication mechanism 214 between physical machines, such as a TCP connection.

In an example embodiment, a specialized application program interface (API) may be provided to allow processes to utilize the file socket. Since the file socket may utilize a stream-based API, in some example embodiments the file socket may be implemented as an extension to an existing socket API offering stream-based communication, such as a Java Socket API. This helps to preserve existing protocols (e.g., debugging, profiling, monitoring, etc.) while changing the underlying communication channel from socket-based to file-socket-based.

Figure 3:
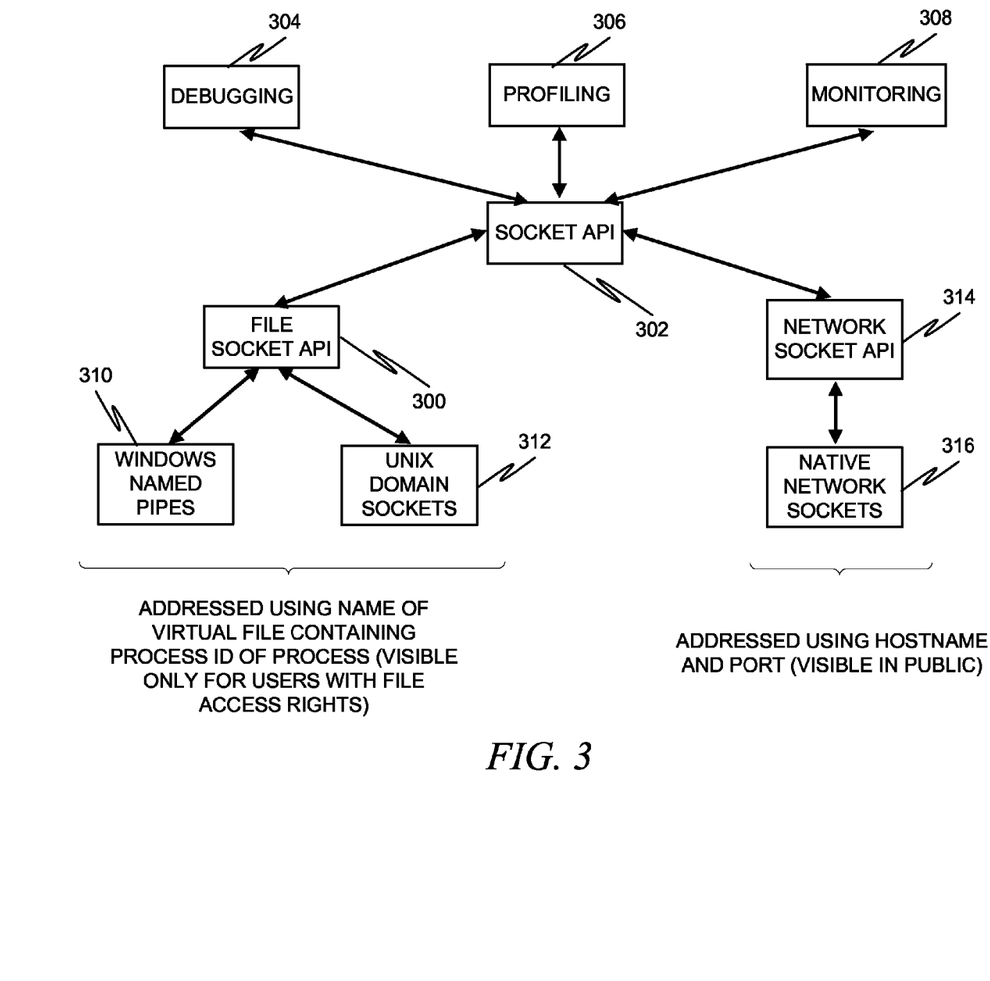
FIG. 3 is a block diagram illustrating a relationship between APIs in accordance with an example embodiment.

FIG. 3 is a block diagram illustrating a relationship among APIs in accordance with an example embodiment. As can be seen, a file socket API 300 may extend a socket API 302, such as a Java socket API, which itself may utilize protocols for debugging 304, profiling 306, and monitoring 308. In an example embodiment, the file socket API 300 may relate to Windows Named Pipes 310 or Unix Domain Sockets 312, which allow for the saving of files by the operating system (but do not, in themselves, allow for stream-based communication or sockets that do not include IP addresses or ports). The address to which communications are directed may then be the name of a virtual file containing a process identification for the process, which is then visible only for users with file access rights. Thus, for example, the name of the virtual file may include an identification of a user concatenated to an identification of a process. In contrast, a traditional network socket 314 may utilize native network sockets 316, which require that the hostname and port be publicly visible in order to communicate. It should be noted that embodiments are foreseen that utilize a combination of file sockets and network sockets, using, for example, the file socket API 300 and the network socket 314. In such a combination, the network socket 314 may be utilized for communications via traditional sockets (e.g., addressed using IP addresses and ports), while the file socket API 300 can be used for communications via file sockets (e.g., addressed using the virtual file identification, and potentially including file access restrictions).

Figure 4:
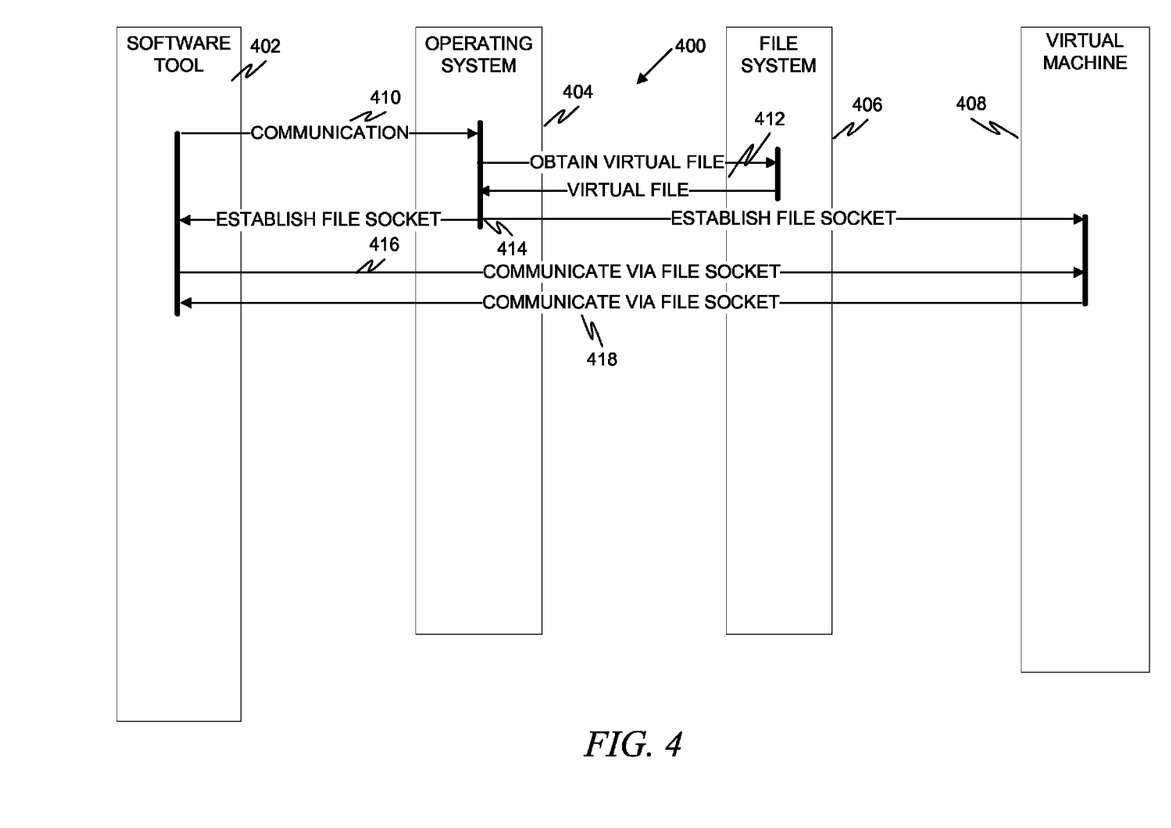
FIG. 4 is a sequence diagram illustrating a method, in accordance with an example embodiment.

FIG. 4 is a sequence diagram illustrating a method 400, in accordance with an example embodiment. The method 400 may utilize a software tool 402, an operating system 404, a file system 406, and a virtual machine 408. In an example embodiment, the software tool 402, operating system 404, file system 406, and virtual machine 408 are all located on the same physical computing device. While in some example embodiments the software tool 402, operating system 404, and virtual machine 408 are all located on the same physical computing device, in such embodiments the file system 406 could still be located on a different physical computing device.

At operation 410, the software tool 402 may send a communication to the virtual machine 408. This communication may actually be directed to a virtual file stored in the file system 406, and may be first received by the operating system 404. In some example embodiments, the communication may actually be intercepted by the operating system 404 without the software tool's knowledge; however, in some example embodiments, the software tool 402 is aware that the communication will be received by the operating system 404. At operation 412, the operating system 404 retrieves the virtual file from the file system 406 using an identification contained in the communication. The identification may contain, for example, an identification of a process associated with the virtual machine 408. In another example embodiment, the identification may also contain an identification of the user requesting use of the process. These pieces of information may be used to uniquely identify the virtual file associated with a particular file socket. The virtual file itself may contain the information used to establish a file socket. This may include, for example, communications guidelines. In another example embodiment, the virtual file may also include security parameters, such as file access rights, allowing the creator of the file socket to establish security groups. At operation 414, the operating system 404 establishes a file socket between the software tool 402 and the virtual machine 408, the file socket corresponding to parameters defined in the virtual file.

At this point, the software tool 402 is free to communicate to the virtual machine 408 via the file socket, and vice-versa. As such, operation 416 is shown depicting the software tool 402 communicating with the virtual machine 408 via the file socket and operation 418 is shown depicting the virtual machine 408 communicating with the software tool 402 via the file socket.

While the operation is not pictured, at some point the operating system 404 may disable the file socket, thus preventing the software tool 402 from communicating with the virtual machine 408.

Figure 5:
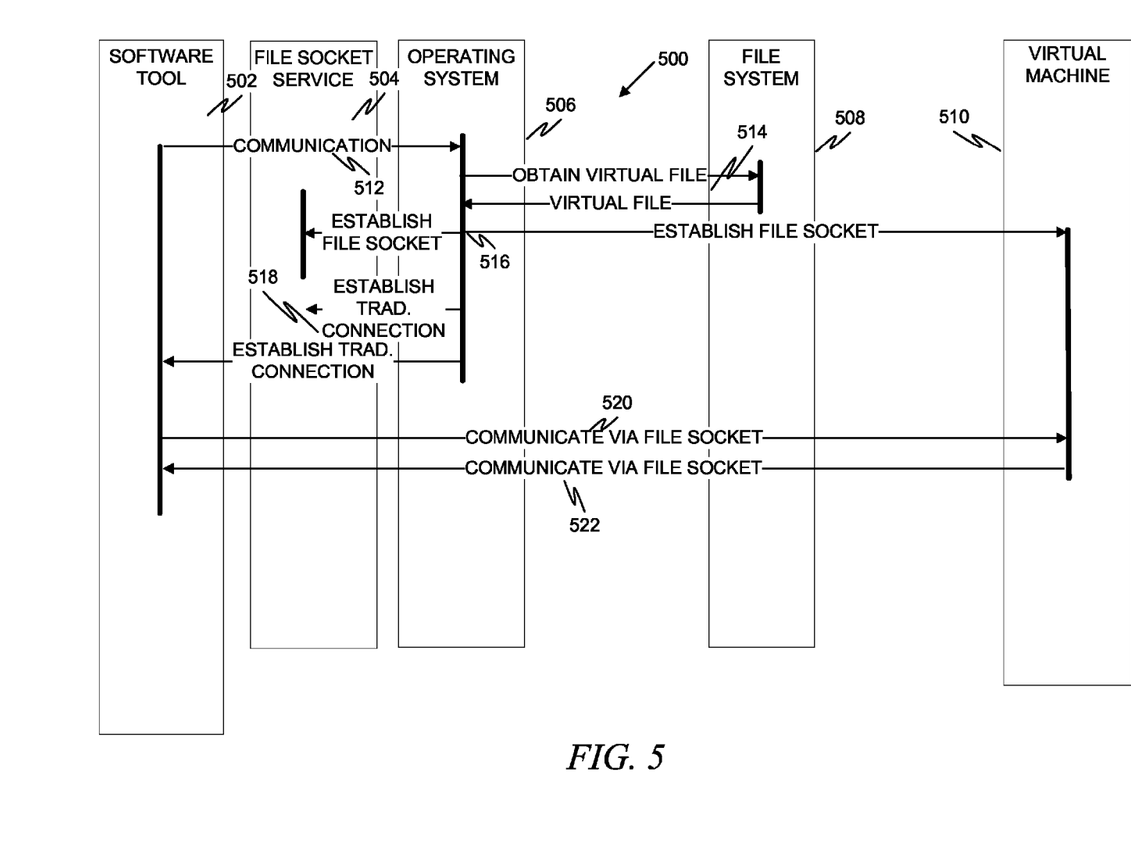
FIG. 5 is a sequence diagram illustrating a method, in accordance with another example embodiment.

FIG. 5 is a sequence diagram illustrating a method 500, in accordance with another example embodiment. The method 500 may utilize a software tool 502, a file socket service 504, an operating system 506, a file system 508, and a virtual machine 510. In an example embodiment, the software tool 502 is located on a first physical computing device and the file socket service 504, operating system 506, file system 508, and virtual machine 510 are located on a second physical computing device. While in some example embodiments the operating system 506 and virtual machine 510 are both located on the same physical computing device, in such embodiments the file system 508 could still be located on a different physical computing device than either the first physical computing device or the second physical computing device.

At operation 512, the software tool 502 may send a communication to the virtual machine 510. This communication may actually be directed to a virtual file stored in the file system 508, and may be first received by the operating system 506. In some example embodiments, the communication may actually be intercepted by the operating system 506 without the software tool's knowledge; however, in some example embodiments, the software tool 502 is aware that the communication will be received by the operating system 506. At operation 514, the operating system 506 retrieves the virtual file from the file system 508 using an identification contained in the communication. The identification may contain, for example, an identification of a process associated with the virtual machine 510. In another example embodiment, the identification may also contain an identification of the user requesting use of the process. These pieces of information may be used to uniquely identify the virtual file associated with a particular file socket. The virtual file itself may contain the information used to establish a file socket. This may include, for example, communications guidelines. In another example embodiment, the virtual file may also include security parameters, such as file access rights, allowing the creator of the file socket to establish security groups. At operation 516, the operating system 506 establishes a file socket between the file socket service 504 and the virtual machine 510, the file socket corresponding to parameters defined in the virtual file. At operation 518, the operating system 506 establishes a traditional communications channel between the software tool 502 and the file socket service 504.

At this point, the software tool 502 is free to communicate to the virtual machine 510 via the combination of the traditional communications channel and the file socket, and vice-versa. As such, operation 520 is shown depicting the software tool 502 communicating with the virtual machine 510 via the file socket and operation 522 is shown depicting the virtual machine 510 communicating with the software tool 502 via the file socket.

While the operation is not pictured, at some point the operating system 506 may disable the file socket, thus preventing the software tool 502 from communicating with the virtual machine 510. In such an instance, communication between the software tool 502 and the virtual machine 510 may take place via some other means, such as through a network socket, until or unless a new file socket is established and/or the old file socket is reestablished.

Figure 6:
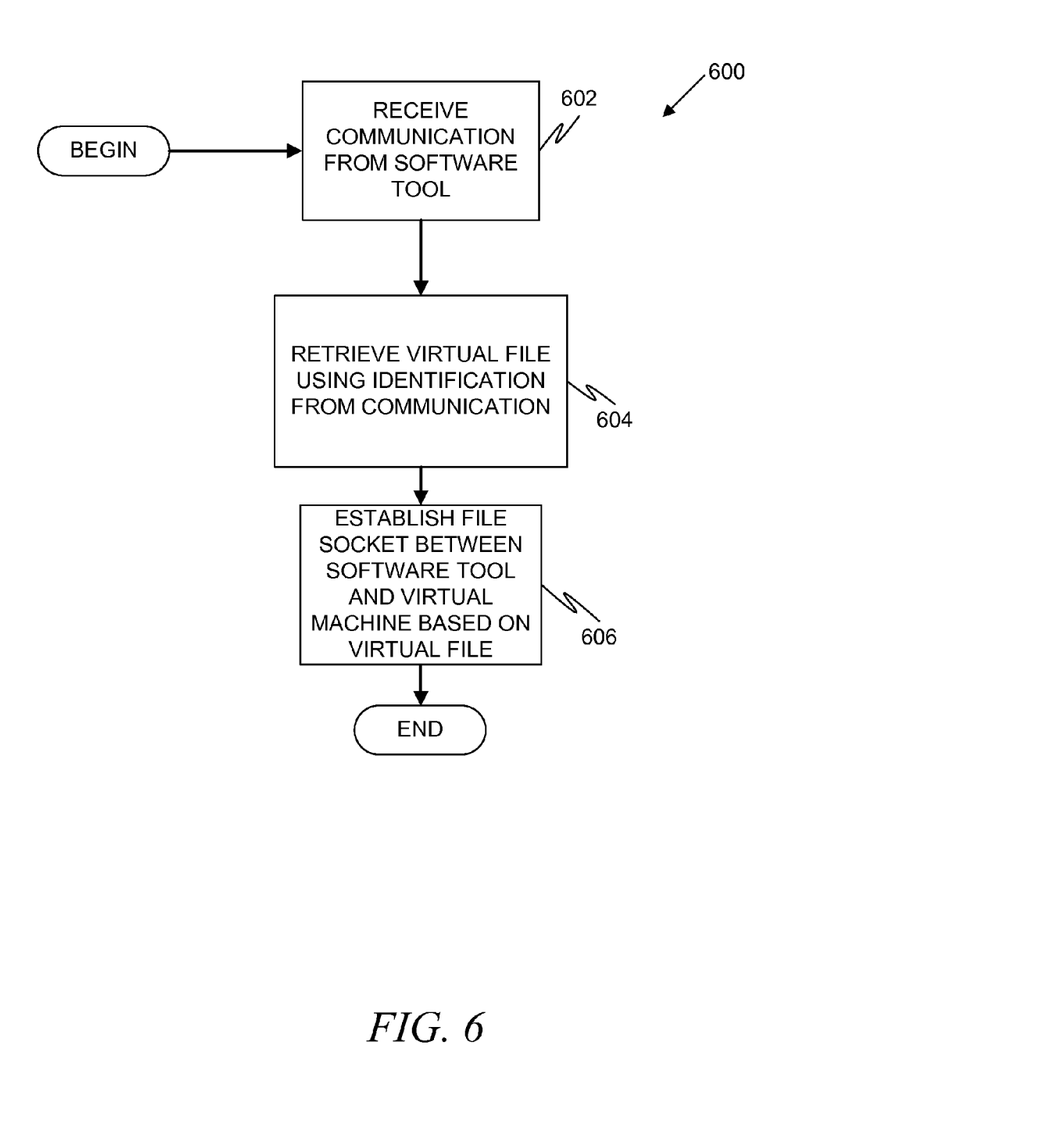
FIG. 6 is a flow diagram illustrating a method, in accordance with an example embodiment.

FIG. 6 is a flow diagram illustrating a method 600, in accordance with an example embodiment. In an example embodiment, the method 600 may be executed by an operating system of a physical computing device. This may be the same physical computing device on which a virtual machine is running. At operation 602, a communication is received from a software tool, the communication intended for the virtual machine and containing an identification of a virtual file. This communication may actually be directed to a virtual file stored in a file system, and may be first received by the operating system. In some example embodiments, the communication may actually be intercepted by the operating system without the software tool's knowledge; however, in some example embodiments, the software tool is aware that the communication will be received by the operating system. At operation 604, the virtual file is retrieved using the identification, the virtual file defining a file socket, the file socket providing a communications channel for stream-based communications. The identification may contain, for example, an identification of a process associated with the virtual machine. In another example embodiment, the identification may also contain an identification of the user requesting use of the process. These pieces of information may be used to uniquely identify the virtual file associated with a particular file socket. The virtual file itself may contain the information used to establish a file socket. This may include, for example, communications guidelines. In another example embodiment, the virtual file may also include security parameters, such as file access rights, allowing the creator of the file socket to establish security groups. At operation 606, the file socket is established as a communications channel between the software tool and the virtual machine based on the virtual file. Depending on the implementation, this may involve a number of different, potentially varying steps. In an embodiment where the software tool is located on the same physical computing device as the virtual machine, this step may involve the establishment of a file socket between the software tool and the virtual machine. In an embodiment where the software tool is located on a different physical computing device from the virtual machine, this step may involve the establishment of a file socket between the virtual machine and a file socket service located on the same physical computing device as the virtual machine, and then the establishment (or at least utilization) of a traditional socket between the software tool and the file socket service.

Example Mobile Device

Figure 7:
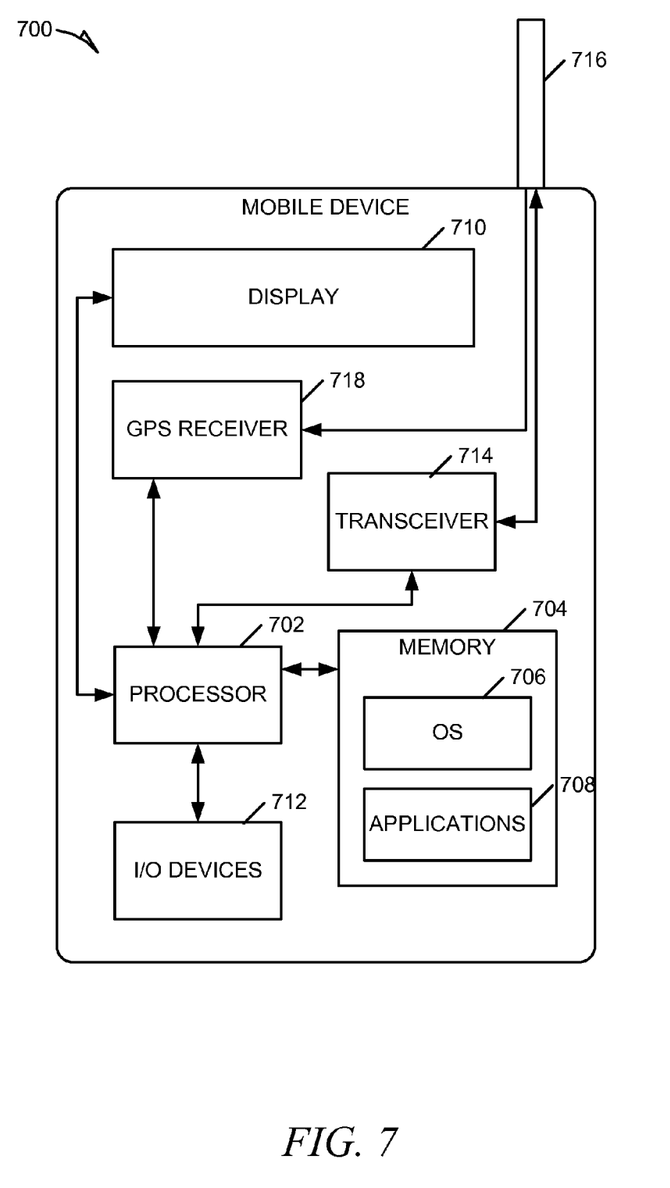
FIG. 7 is a block diagram illustrating a mobile device, according to an example embodiment.

FIG. 7 is a block diagram illustrating a mobile device 700, according to an example embodiment. The mobile device 700 can include a processor 702. The processor 702 can be any of a variety of different types of commercially available processors 702 suitable for mobile devices 700 (for example, an XScale architecture microprocessor, a microprocessor without interlocked pipeline stages (MIPS) architecture processor, or another type of processor 702). A memory 704, such as a random access memory (RAM), a flash memory, or another type of memory, is typically accessible to the processor 702. The memory 704 can be adapted to store an operating system (OS) 706, as well as application programs 708. The processor 702 can be coupled, either directly or via appropriate intermediary hardware, to a display 710 and to one or more input/output (I/O) devices 712, such as a keypad, a touch panel sensor, a microphone, and the like. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Modules, Components and Logic

Certain embodiments are described herein as including logic or a number of components, modules, or mechanisms.

Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors 702 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 702 or other programmable processor 702) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 702 configured using software, the general-purpose processor 702 can be configured as different hardware-implemented modules at different times. Software can accordingly configure a processor 702, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 702 that are temporarily configured (e.g., by software) or permanently configured to perform the relevant operations. Whether temporarily or permanently configured, such processors 702 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or processors 702 or processor-implemented modules. The performance of certain of the operations can be distributed among the one or more processors 702, not only residing within a single machine, but deployed across a number of machines. In some example embodiments, the processor 702 or processors 702 can be located in a single location (e.g., within a home environment, an office environment, or a server farm), while in other embodiments, the processors 702 can be distributed across a number of locations.

The one or more processors 702 can also operate to support performance of the relevant operations in a "cloud computing" environment or as a "software as a service" (SaaS). For example, at least some of the operations can be performed by a group of computers (as examples of machines including processors 702), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 702, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 702 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 702), or in a combination of permanently and temporarily configured hardware can be a design choice. Below are set out hardware (e.g., machine) and software architectures that can be deployed, in various example embodiments.

Example Machine Architecture and Machine-Readable Medium

Figure 8:
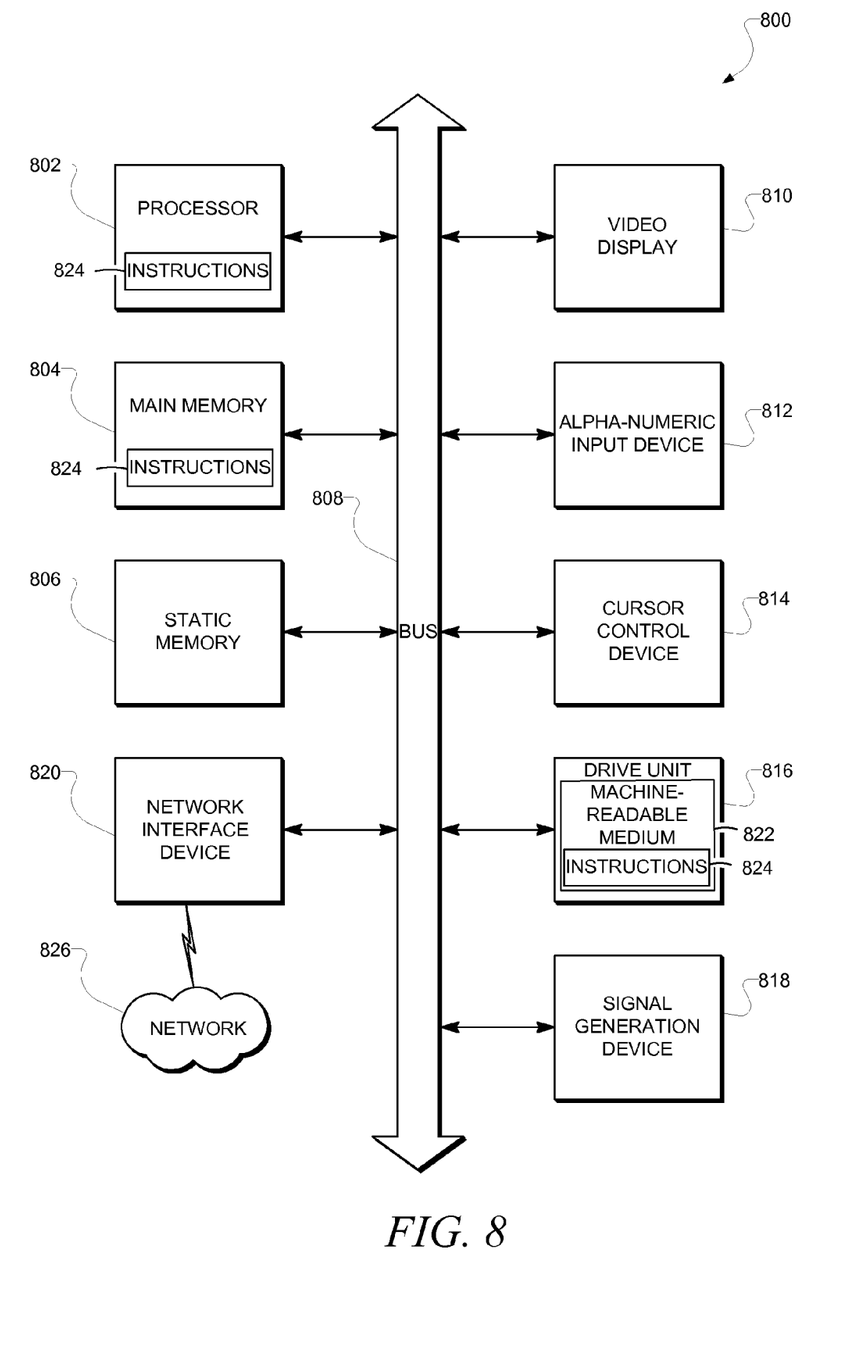
FIG. 8 is a block diagram of machine in the example form of a computer system within which instructions, for causing the machine to perform any one or more of the methodologies discussed herein, can be executed.

FIG. 8 is a block diagram of machine in the example form of a computer system 800 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a CPU, a graphics processing unit (GPU), or both), a main memory 804 and a static memory 806, which communicate with each other via a bus 808. The computer system 800 can further include a video display 810 (e.g., a liquid crystal display (LCD) or a cathode ray tube (CRT)). The computer system 800 also includes an alphanumeric input device 812 (e.g., a keyboard or a touch-sensitive display screen), a cursor control device 814 (e.g., a mouse), a drive unit 816, a signal generation device 818 (e.g., a speaker), and a network interface device 820.

Machine-Readable Medium

The drive unit 816 includes a machine-readable medium 822 on which is stored one or more sets of instructions (e.g., software) 824 embodying or utilized by any one or more of the methodologies or functions described herein. The instructions 824 can also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" can include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 can further be transmitted or received over a communications network 826 using a transmission medium. The instructions 824 can be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
  receiving a communication from a software tool, the communication intended for a virtual machine and containing an identification of a virtual file;
  retrieving the virtual file using the identification, the virtual file defining a file socket, the file socket providing a communications channel for stream-based communications, the virtual;
establishing the file socket as a communications channel between the software tool and the virtual machine based on the virtual file by implementing the communications channel in accordance with the communications guidelines and file access rights in the virtual file retrieved using the identification;
receiving a communication from the software tool identifying the file socket; and
in response to the receiving of the communication from the software tool identifying the file socket, transferring the communication to the virtual machine through the file socket and,
wherein the virtual file is stored by an operating system using a naming convention that assigns the virtual file a unique name based on an identification of one or more users authorized to utilize the file socket and one or more processes that utilize the file socket.

2. The method of claim 1, wherein the software tool and the virtual machine are both located on a single physical computing device.

3. The method of claim 1, wherein the software tool is located on a first physical computing device and the virtual machine is located on a second physical computing vice.

4. The method of claim 3, wherein the establishing of the file socket includes establishing the file socket as a communications channel between a file socket service located on the second physical computing device and the virtual machine, and establishing a traditional communications channel as a communications channel between the software tool and the file socket service.

5. The method of claim 1, wherein the software tool is a debugger.

6. The method of claim 1, wherein the software tool is a profiler.

7. The method of claim 1, wherein the software tool is a monitor.

8. A system comprising:
a file system;
a software tool;
a virtual machine; and
an operating system comprising one or more processors configured to: store a virtual file defining a file socket, the file socket providing a communications channel for stream-based communications and providing an ability to send file descriptors over the communications channel, the virtual file containing receive a communication from the software tool, the communication intended for the virtual machine and containing an identification of the virtual file;
retrieve the virtual file using the identification;
establish the file socket as a communications channel between the software tool and the virtual machine based on the virtual file by implementing the communications channel in accordance with the communication guidelines and file access rights in the virtual file retrieved using the identification;
receive a communication from the software tool identifying the file socket;
in response to the receiving of the communication from the software tool identify the file socket, transferring the communication to the virtual machine through the file socket, and
wherein the virtual file is stored using a naming convention that assigns the virtual file a unique name based on an identification of one or more users authorized to utilize the file socket and one or more processes that utilize the file socket.

9. The system of claim 8, wherein the software tool and the virtual machine are both located on a single physical computing device.

10. The system of claim 8, wherein the software tool is located on a first physical computing device and the virtual machine is located on a second physical computing device.

11. The system of claim 10, wherein the establishing of the file socket includes establishing the file socket as a communications channel between a file socket service located on the second physical computing device and the virtual machine, and establishing a traditional communications channel as a communications channel between the software tool and the file socket service.

12. A non-transitory machine-readable storage medium comprising instructions, which when implemented by one or more machines, cause the one or more machines to perform operations for performing static code analysis on computer code, the operations comprising:
receiving a communication from a software tool, the communication intended for a virtual machine and containing an identification of a virtual file;
retrieving the virtual file using the identification, the virtual file defining a socket, the file socket providing a communications channel for stream-based communications;
establishing the file socket as a communications channel between the software tool and the virtual machine based on the virtual file;
receiving a communication from the software tool identifying the file socket;
in response to the receiving of the communication from the software tool identifying the file socket, transferring the communication to the virtual machine through the file socket: and
wherein the virtual file is stored using a naming convention that assigns the virtual file a unique name based on an identification of one or more users authorized to utilize the file socket and one or more processes that utilize the file socket.

13. The non-transitory machine-readable storage medium of claim 12, wherein the software tool and the virtual machine are both located on a single physical computing device.

14. The non-transitory machine-readable storage medium of claim 12, wherein the software tool is located on a first physical computing device and the virtual machine is located on a second physical computing device.

15. The non-transitory machine-readable storage medium of claim 14, wherein the establishing of the socket includes establishing the file socket as a communications channel between a socket service located on the second physical computing device and the virtual machine, and establishing a traditional communications channel as a communications channel between the software tool and the socket service.

16. The non-transitory machine-readable storage medium of claim 12, wherein the software tool is a debugger.

17. The non-transitory machine-readable storage medium of claim 12, wherein the software tool is a profiler.

18. The non-transitory machine-readable storage medium of claim 12, wherein the software tool is a monitor.

* * * * *